(12) United States Patent
Imai

(10) Patent No.: US 11,782,155 B2
(45) Date of Patent: Oct. 10, 2023

(54) DISTANCE MEASUREMENT DEVICE AND DISTANCE MEASUREMENT SYSTEM

(71) Applicant: Hitachi-LG Data Storage, Inc., Tokyo (JP)

(72) Inventor: Takeshi Imai, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 528 days.

(21) Appl. No.: 17/002,997

(22) Filed: Aug. 26, 2020

(65) Prior Publication Data

US 2021/0103054 A1 Apr. 8, 2021

(30) Foreign Application Priority Data

Oct. 4, 2019 (JP) .................................. 2019-183843

(51) Int. Cl.
| | |
|---|---|
| *G01S 17/10* | (2020.01) |
| *G01S 7/497* | (2006.01) |
| *G01S 7/4865* | (2020.01) |
| *G01S 7/48* | (2006.01) |

(52) U.S. Cl.
CPC ............ *G01S 17/10* (2013.01); *G01S 7/4808* (2013.01); *G01S 7/4865* (2013.01); *G01S 7/497* (2013.01)

(58) Field of Classification Search
CPC ........ G01S 17/10; G01S 7/497; G01S 7/4865; G01S 7/4808
See application file for complete search history.

(56) References Cited

U.S. PATENT DOCUMENTS

| | | | |
|---|---|---|---|
| 2015/0355330 A1 | 12/2015 | Oberhammer et al. | |
| 2017/0074976 A1* | 3/2017 | Takahashi | ............... G01C 3/085 |
| 2018/0081043 A1* | 3/2018 | Demirtas | ................ H04N 23/56 |
| 2018/0135980 A1* | 5/2018 | Nakamura | ............... G01S 17/10 |
| 2018/0227475 A1* | 8/2018 | Kishimoto | ............. H04N 23/74 |
| 2019/0383946 A1 | 12/2019 | Namba | |

FOREIGN PATENT DOCUMENTS

| | | |
|---|---|---|
| JP | 2016-502657 A | 1/2016 |
| WO | 2015/190015 A1 | 12/2015 |
| WO | 2018/159289 A1 | 12/2019 |

OTHER PUBLICATIONS

Japanese Office Action received in corresponding Japanese Application No. 2019-183843 dated Nov. 15, 2022.

\* cited by examiner

*Primary Examiner* — Yuqing Xiao
*Assistant Examiner* — Zhengqing Qi
(74) *Attorney, Agent, or Firm* — MATTINGLY & MALUR, PC

(57) ABSTRACT

A distance measurement device includes a light emitting unit; a light receiving unit; a distance calculation unit that calculates a distance to an object; and a controller that controls the light emitting unit and the light receiving unit to determine whether or not there is interference from another distance measurement device, from a distance calculation result from the distance calculation unit. The controller includes a light emission and exposure period-setting unit that sets a light emission and exposure period of the light emitting unit and the light receiving unit, a distance variation measurement unit that measures a variation of distance values repeatedly obtained in a predetermined duration by the distance calculation unit, and an interference determination unit that compares a distance variation value to a threshold value which is determined in advance, to determine whether or not there is interference.

7 Claims, 10 Drawing Sheets

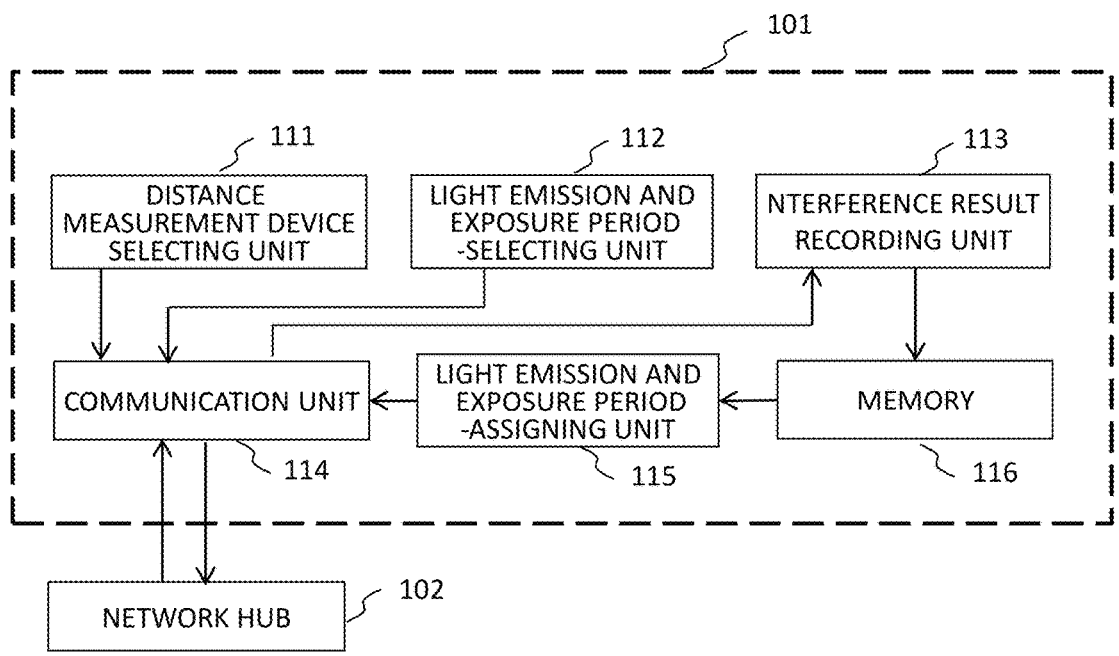

FIG. 12

CONFIGURATION EXAMPLE OF MEMORY 116

| ADDRESS | INTERFERENCE DETECTION RESULT | INTERFERENCE DETECTION DEVICE | INTERFERENCE LIGHT GENERATION DEVICE |
|---|---|---|---|
| 1 | 01 | 1 | 2 |
| 2 | 00 | 1 | 3 |
| 3 | 00 | 1 | 4 |
| 4 | 00 | 1 | 5 |
| 5 | 01 | 1 | 6 |
| 6 | 01 | 1 | 7 |
| ... | ... | ... | ... |
| 87 | 00 | 10 | 6 |
| 88 | 00 | 10 | 7 |
| 89 | 00 | 10 | 8 |
| 90 | 01 | 10 | 9 |

00 : THERE IS NO INTERFERENCE
01 : THERE IS INTERFERENCE

FIG. 13

EXAMPLE OF INTERFERENCE RESULTS AND ASSIGNMENT OF PERIODS

| DISTANCE MEASUREMENT DEVICE | MATING DEVICE (x: INTERFERENCE OCCURS) | | | | | | | | | | NUMBER OF DEVICES THAT ARE INTERFERENCE SOURCES | ASSIGNED PERIOD NUMBER k | INTERFERENCE SOURCE OF DEVICE 1 | INTERFERENCE SOURCE OF DEVICE 10 |
|---|---|---|---|---|---|---|---|---|---|---|---|---|---|---|
| | 1 | 2 | 3 | 4 | 5 | 6 | 7 | 8 | 9 | 10 | | | | |
| 1 | x | | | | x | x | | | | | 3 | 2 (DUPLICATED) | | |
| 2 | x | | x | | | x | x | x | | | 5 | 4 | x | |
| 3 | | x | | x | | x | x | x | | | 5 | 5 | | |
| 4 | | | x | | x | x | x | x | x | | 6 | 2 | | |
| 5 | | | | x | | x | x | x | x | | 5 | 6 | | x |
| 6 | x | x | x | x | | x | | | | | 5 | 7 | x | |
| 7 | x | x | x | x | x | | x | | | | 7 | 1 | x | |
| 8 | | x | x | x | x | | x | | x | | 6 | 3 | | |
| 9 | | | x | x | | x | | x | | | 4 | 8 | | x |
| 10 | | | | | x | | | x | | | 2 | 1 (DUPLICATED) | | |

DISTANCE MEASUREMENT DEVICE AND DISTANCE MEASUREMENT SYSTEM

CLAIM OF PRIORITY

The present application claims priority from Japanese patent application serial No. JP 2019-183843, filed on Oct. 4, 2019, the content of which is hereby incorporated by reference into this application.

BACKGROUND OF THE INVENTION

(1) Field of the Invention

The present invention relates to a distance measurement device and a distance measurement system that measure a distance to an object by a time of flight of light.

(2) Description of the Related Art

In order to measure a distance to an object to obtain a distance image, a distance measurement imaging device (hereinafter, distance measurement device) that uses a method (Time of Flight (TOF)) for measuring a distance by a time of flight until irradiation light is reflected by the object to return to the device has been put into practical use. In order to measure a distance, the distance measurement device periodically repeats the emission of irradiation light and the exposure of reflected light, and calculates a time delay of the reflected light for the irradiation light from the amount of exposure accumulated in a predetermined exposure duration, to obtain the distance. In that case, when a plurality of the distance measurement devices are installed in the same measurement space to perform a distance measurement operation at the same time, irradiation light from other devices is incident into a host device to cause a change in the amount of exposure, so that the distance measurement may not be accurately performed. Regarding such light interference between the devices, the following interference detection and interference measures are proposed.

In JP 2016-502657 A, four phase images having different exposure phases are acquired, and the sum value of the phase image (0°) and the phase image (180°) and the sum value of the phase image (90°) and the phase image (270°) are calculated. It is described that when the two sum values are not approximate to 0, distance measurement is determined to be affected by external light (there is interference).

WO 2015/190015 A describes that an exposure process corresponding to a specific exposure signal (difference between light emission timing and exposure timing) is performed twice, and based on a difference between the amounts of exposure, it is determined whether or not there is interference from other devices.

In addition, in each of JP 2016-502657 A and WO 2015/190015 A, when interference of external light is detected during usage of the distance measurement device (namely, during distance measurement operation), in order to avoid the interference, a record mode (light emission and exposure timing) is changed. As a method for avoiding interference, JP 2016-502657 A describes that a record operation is interrupted and after a time that is set in advance, recording is attempted again, and WO 2015/190015 A describes that when interference is detected, the next light emission is delayed by two times the exposure duration.

SUMMARY OF THE INVENTION

In the interference measures described in JP 2016-502657 A and WO 2015/190015 A, the setting is changed such that the light emission and exposure durations of the host device and the other devices do not overlap each other, and thus the host device is not exposed to interference light from the other devices. However, this method has the following problems.

In JP 2016-502657 A and WO 2015/190015 A, since interference measures are taken during usage of the distance measurement device, a measurement result in a duration where the interference is detected includes a distance error caused by the interference, and cannot be used as effective data. Therefore, it is required to perform measurement in the duration again and the measurement rate is reduced to that extent.

In a distance measurement system using a plurality of distance measurement devices, the shifting of the light emission and exposure durations of the devices from each other is effective in avoiding interference. However, when the number of the devices is increased, the assignments of the "shift time" become insufficient, and thus it is not possible to realize a state where the light emission and exposure durations do not overlap between all of the devices (namely, a state where no interference occurs). In order to avoid the above situation, when the interval of the light emission and exposure durations for the devices is increased, the measurement rate is reduced.

Alternatively, the setting of different light emission and exposure periods for the devices is effective in avoiding interference. However, when the number of the devices is increased, the number of the light emission and exposure periods to be allocated becomes insufficient, and thus there are difficulties in converging to a state where no interference occurs between all of the devices.

The present invention is made in light of the above problems, and an object of the present invention is to provide a distance measurement device and a distance measurement system that can reliably avoid interference between devices without reducing a measurement rate even if a large number of the distance measurement devices are used.

According to an aspect of the present invention, there is provided a distance measurement device including: a light emitting unit that irradiates an object with pulsed light emitted from a light source; a light receiving unit that exposes the pulsed light, which is reflected by the object, to an image sensor to convert the pulsed light into an electric signal; a distance calculation unit that calculates a distance to the object from an output signal of the light receiving unit; and a controller that controls the light emitting unit and the light receiving unit to determine whether or not there is interference from another distance measurement device, from a distance calculation result from the distance calculation unit. The controller includes a light emission and exposure period-setting unit that sets a light emission and exposure period of the light emitting unit and the light receiving unit, a distance variation measurement unit that measures a variation of distance values repeatedly obtained in a predetermined duration by the distance calculation unit, and an interference determination unit that compares a distance variation value measured by the distance variation measurement unit to a threshold value which is determined in advance, to determine whether or not there is interference.

According to another aspect of the present invention, there is provided a distance measurement system in which when a plurality of distance measurement devices are installed to measure a distance, each of the distance measurement devices is connected to a management device and which assigns a light emission and exposure period to each of the distance measurement devices, in which the management device includes a distance measurement device-selecting unit that sequentially selects a distance measurement device that performs interference detection and a distance measurement device that emits light which is interference light, from the distance measurement devices, to perform an interference detection operation, a light emission and exposure period-selecting unit that sets the same light emission and exposure period for the selected distance measurement devices so as to detect interference, an interference result recording unit that receives interference detection results from the selected distance measurement devices to record the interference detection results in a memory, and a light emission and exposure period-assigning unit that reads the interference detection results from the memory to assign a light emission and exposure period for avoiding interference to each of the distance measurement devices. Here, the light emission and exposure period-assigning unit assigns light emission and exposure periods, which are not assigned to distance measurement devices that are interference sources, to distance measurement devices in order of having a larger interference with other distance measurement devices.

The present invention provides the distance measurement device and the distance measurement system that can figure out light emission and exposure periods causing interference, and reliably avoid interference between the devices without reducing a measurement rate even if a large number of the distance measurement devices are used.

BRIEF DESCRIPTION OF THE DRAWINGS

These and other features, objects and advantages of the present invention will become more apparent from the following description when taken in conjunction with the accompanying drawings wherein:

FIG. 10B is a block diagram illustrating a functional configuration of a management device (PC) 101;

FIG. 11 is a table showing a combination of distance measurement devices that perform interference detection;

FIG. 12 is a table showing a configuration example of a memory 116;

FIG. 13 is a table showing an example of interference detection results and the assignment of light emission and exposure periods.

DETAILED DESCRIPTION OF THE EMBODIMENT

Hereinafter, embodiments of the present invention will be described. A first embodiment describes a case where it is determined whether or not an individual distance measurement device receives interference from other devices. A second embodiment describes a case where a light emission and exposure period is assigned to each device in a distance measurement system in which a plurality of the distance measurement devices are installed.

First Embodiment

Figure 1A:
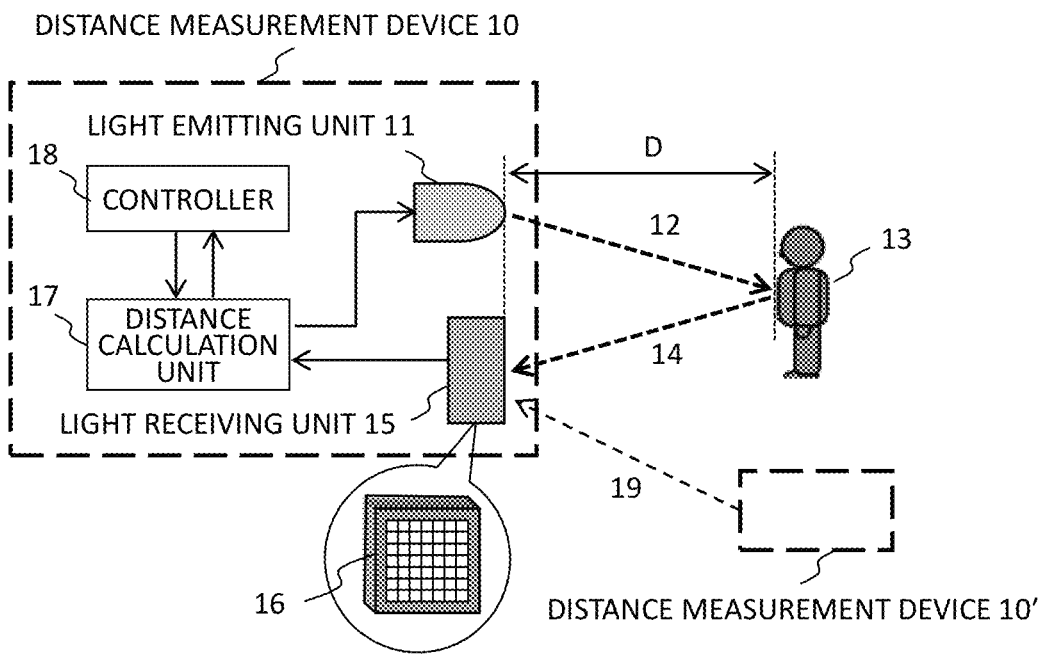
FIG. 1A is a configuration diagram illustrating a distance measurement device according to a first embodiment.

FIG. 1A is a configuration diagram illustrating a distance measurement device according to a first embodiment. A distance measurement device 10 measures a distance to an object 13 to be measured such as a person or an inanimate object by a TOF method to output the measured distances to parts of the object as two-dimensional distance data, namely, a distance image. The configuration of the device includes a light emitting unit 11, a light receiving unit 15, a distance calculation unit 17, and a controller 18.

The light emitting unit 11 drives a light source such as a laser diode to emit pulsed irradiation light 12 such as laser. The light receiving unit 15 detects pulsed reflected light 14 of the irradiation light 12, which is reflected and returned from the object 13. The light receiving unit 15 is configured such that an image sensor 16 in which CCD sensors or the like are two-dimensionally arranged is exposed to light to convert the light intensity at the position of each pixel into an electric signal. The distance calculation unit 17 calculates a distance D to the object 13 from the output signal from the light receiving unit 15 to generate two-dimensional distance image data.

In that case, when other distance measurement device 10' is present in the vicinity of the distance measurement device 10, irradiation light or reflected light thereof from the distance measurement device 10' may become interference light 19 to be incident into the light receiving unit 15. The interference light 19 affects the distance D calculated by the distance calculation unit 17.

The controller 18 sets the light emission period of the irradiation light 12 from the light emitting unit 11 and the exposure period of the reflected light 14 to the light receiving unit 15 via the distance calculation unit 17, and determines whether or not there is interference, based on a change (variation) in the distance D calculated by the distance calculation unit 17. In that case, in order to set a plurality of the light emission periods of the irradiation light 12 and the exposure periods of the reflected light 14, a light emission and exposure period list that defines periods which are settable is provided. The result of determination as to whether or not there is interference is displayed by a display unit (unillustrated) or is output to an external device by an output unit (unillustrated). When interference from other devices occurs, other periods on the light emission and exposure period list are applied to the light emitting unit 11 and the light receiving unit 15 by a user or an instruction of an external application, and thus the interference can be avoided.

Figure 1B:
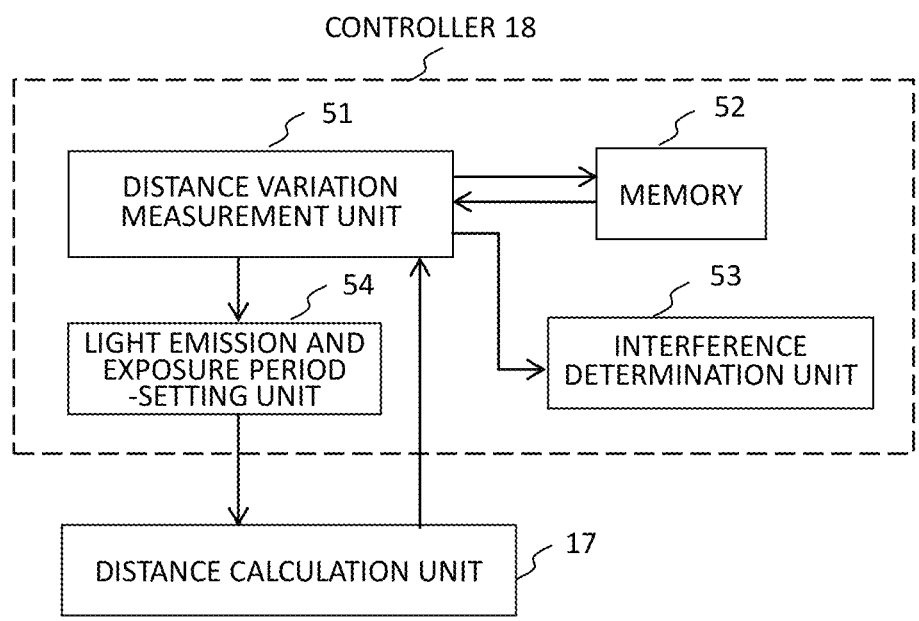
FIG. 1B is a block diagram illustrating a functional configuration of a controller 18.

FIG. 1B is a block diagram illustrating a functional configuration of the controller 18. A distance variation measurement unit 51 sets the start timing of a light emission and exposure duration and the light emission and exposure period for the distance calculation unit 17 via a light emission and exposure period-setting unit 54. The light emission and exposure period-setting unit 54 stores a list of the light emission and exposure periods that are settable. The distance values calculated by the distance calculation unit 17 are stored in a memory 52 via the distance variation measurement unit 51. The distance variation measurement unit 51 calculates variations (standard deviations) of the distance values in a predetermined duration, and the maximum value of the distance variations is obtained. An interference determination unit 53 determines whether or not interference occurs, from the maximum value of the distance variations.

Figure 2:
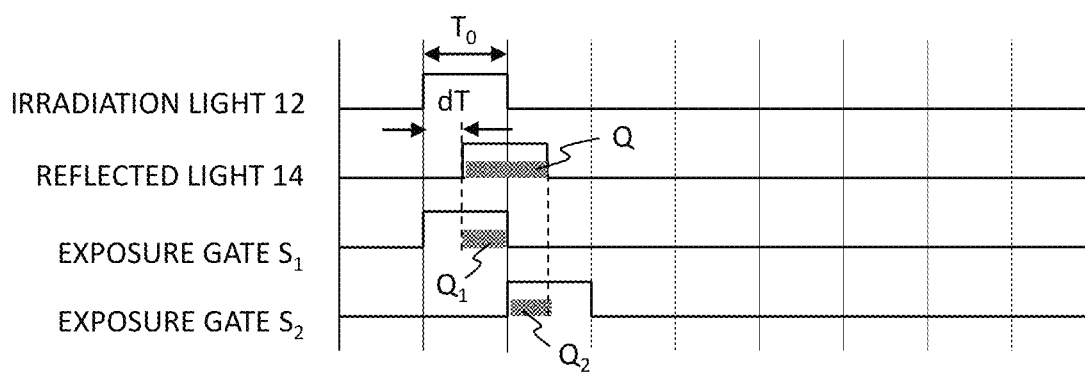
FIG. 2 is a chart describing the principle of distance measurement by a TOF method.

FIG. 2 is a chart describing the principle of distance measurement by the TOF method. In the distance measurement, the distance D to the object 13 can be obtained by $D = dT \times c/2$ based on a time difference dT between the irradiation light 12 and the reflected light 14 (here, c is the speed of light). Here, a case where an exposure operation is divided into and performed in, for example, two gates for the irradiation light 12 (pulse width $T_0$) emitted once is illustrated. Namely, the exposure duration of the reflected light 14 is divided into a first exposure gate $S_1$ and a second exposure gate $S_2$, and the width of each of the gates is equal to the pulse width $T_0$ of the irradiation light 12. The time difference dT can be obtained from electric charge amounts $Q_1$ and $Q_2$ of an electric charge amount Q accumulated in the image sensor, the electric charge amounts $Q_1$ and $Q_2$ being accumulated in the first and second exposure gates $S_1$ and $S_2$, and the pulse width $T_0$ of the irradiation light by the following equation.

$$dT = T_0 \times Q_2/(Q_1+Q_2) \quad (1)$$

The distance D is calculated by the following equation.

$$D = T_0 \times Q_2/(Q_1+Q_2) \times c/2 \quad (2)$$

Incidentally, here, the electric charge amount of background light is ignored for simplicity.

Figure 3:
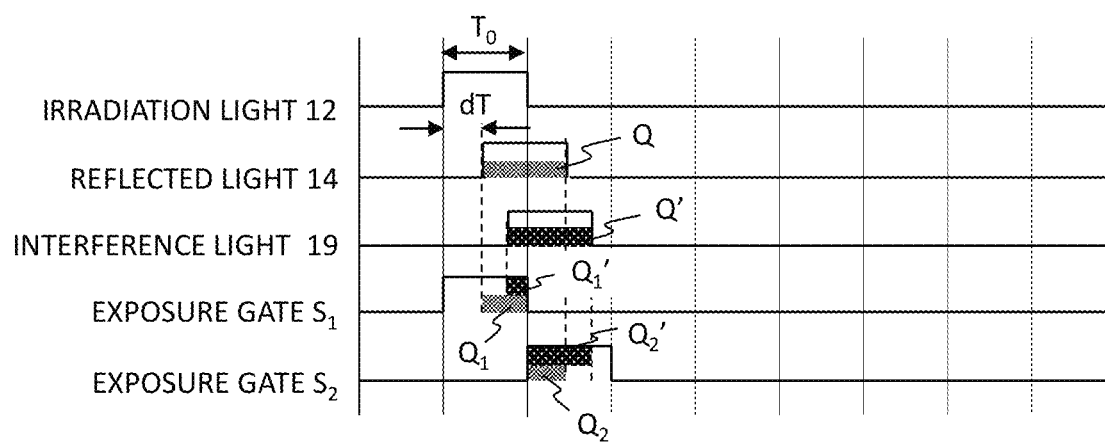
FIG. 3 is a chart describing an influence on distance measurement in the presence of interference.

FIG. 3 is a chart describing an influence on distance measurement in the presence of interference. When the device receives the interference light 19 (irradiation light or reflected light) from another device 10', an error occurs in the measurement value of the distance D.

When an electric charge amount Q' is accumulated in the image sensor due to the interference light 19 from the another device 10', the electric charge amounts accumulated in the first and second exposure gates $S_1$ and $S_2$ are changed to $Q_1+Q_1'$ and $Q_2+Q_2'$. For this reason, a distance D' is as follow and is shifted from the measurement value of D in (2).

$$D' = T_0 \times (Q_2+Q_2')/(Q_1+Q_1'+Q_2+Q_2') \times c/2 \quad (3)$$

Figure 4:
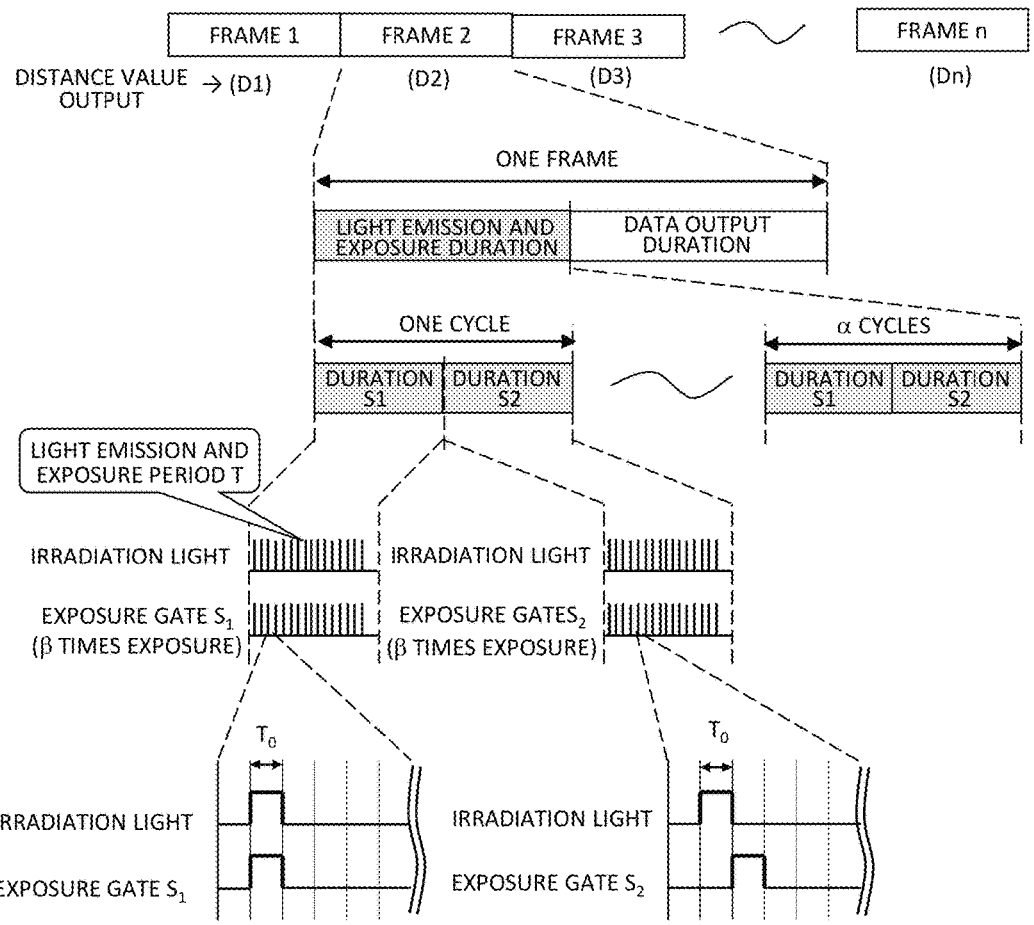
FIG. 4 is an example of a time chart of distance measurement by the distance measurement device.

FIG. 4 is an example of a time chart of distance measurement by the distance measurement device. The distance measurement is executed in unit of frame, for example, at a rate of 30 frames/sec.

One frame includes a light emission and exposure duration where the irradiation light 12 is emitted and the reflected light 14 thereof is exposed and a data output duration where exposed electric charges are output to the distance calculation unit 17, and the durations are alternately repeated. One light emission and exposure duration includes a duration S1 where the light emission pulse illustrated in FIG. 2 is irradiated β times and the first exposure gate $S_1$ is repeated β times, and a duration S2 where the light emission pulse is irradiated β times and the second exposure gate $S_2$ is repeated β times, and the duration S1 and the duration S2 are combined to form one cycle. The pulse interval (period) of the light emissions and exposures that are performed β times is a light emission and exposure period T. In one light emission and exposure duration, the above cycle is repeated α times, and the distance calculation unit 17 calculates the distance D from the electric charge amount $Q_1$ accumulated in the duration S1 and the electric charge amount $Q_2$ accumulated in the duration S2 by the above equation (2). Accordingly, the distance value in each frame can be obtained. In the present embodiment, as will be described later, a variation of n measurement values (D1, D2, . . . , Dn) in a predetermined duration (duration of frames 1 to n) is obtained to determine whether or not there is interference.

Figure 5:
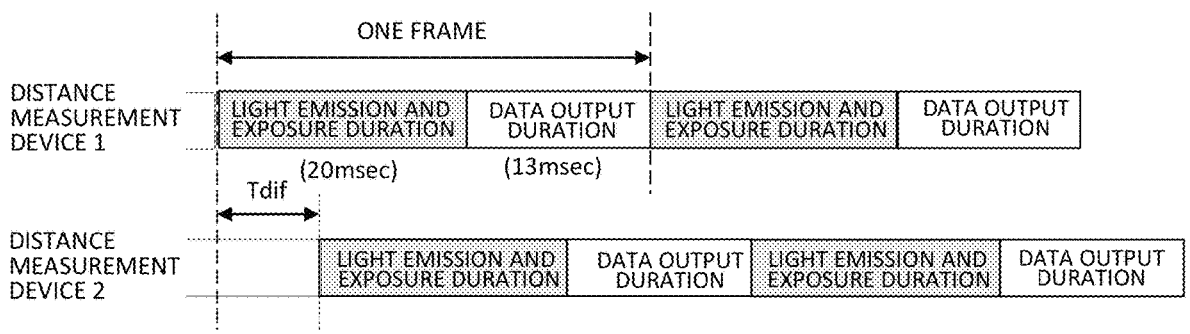
FIG. 5 is a chart describing a condition where interference occurs between distance measurement devices.

FIG. 5 is a chart describing a condition where interference occurs between distance measurement devices. Here, the timings of two light emission and exposure operations of two distance measurement devices 1 and 2 are illustrated.

In the light emission and exposure duration, the light emission operation and the exposure operation illustrated in FIG. 4 are repeated in the light emission and exposure periods T. When the distance measurement device 1 and the distance measurement device 2 are present in the same measurement space and the light emission and exposure periods T thereof are equal, the pulse of interference light from the device 1 is synchronized with the period of the exposure gate of the device 2 to cause interference. In addition, even if the light emission and exposure periods T are equal, the influence of interference depends on overlapping between the light emission and exposure duration of the device 1 and the light emission and exposure duration of the device 2, and the larger the overlapping, the lager the influence of interference. The overlapping of the light emission and exposure durations is determined by a time difference Tdif between the frames of the distance measurement device 1 and the distance measurement device 2, and the smaller the time difference Tdif, the larger the overlapping, and thus the influence of interference is increased.

However, since there is an error in reference clocks that are built in the distance measurement devices 1 and 2 to determine the operation timing, a slight difference occurs in the time of one frame of each distance measurement device. For this reason, it is difficult to perform measurement in a state the time difference Tdif between the light emission and exposure periods is held constant, and the overlapping of the light emission and exposure durations changes periodically as time elapses. Therefore, in the present embodiment, the start timing of the light emission and exposure duration is intentionally shifted by Tdif (variable value) to change the overlapping of the light emission and exposure durations between the devices and to perform measurement. Accordingly, a state where the overlapping of the light emission and exposure durations is maximum, namely, the maximum value of the influence of interference is found.

Hereinafter, an interference detection operation in the present embodiment will be described in detail, and main features adopted in the present embodiment are as follows.

(1) The detection region of the image sensor 16 is optimally divided according to situations, and distance values are acquired in unit of measurement region including one pixel or a plurality of pixels.

(2) The distance values are measured over a plurality of the frames and whether or not there is interference is determined from a variation (standard deviation) of the distance values.

(3) The light emission and exposure period of a host device is changed and then measurement is performed to specify a light emission and exposure period where interference from other devices is received.

Figure 6:
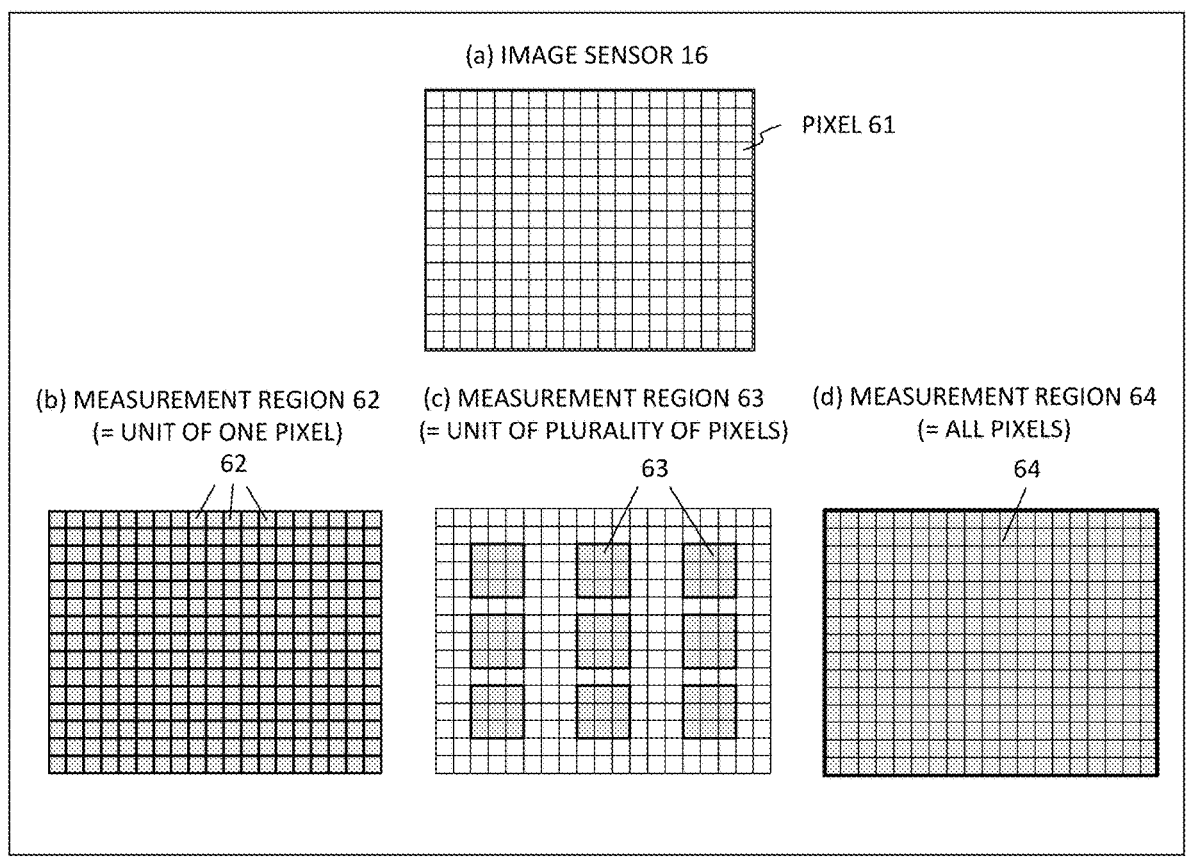
FIG. 6 illustrates views of pixel arrays and measurement regions of an image sensor 16.

FIG. 6 illustrates views of the pixel arrays and the measurement regions of the image sensor 16. (a) illustrates an example of the pixel array of the image sensor 16. One square represents one pixel 61 and here, the number of the pixels is 20×15 for simplicity. The distance calculation unit 17 performs distance calculation in unit of the pixel 61 based on a signal from the image sensor 16. The distance variation measurement unit 51 handles distance data in unit of one pixel or a plurality of pixels. Here, the region that is the unit of acquisition of the distance data is referred to as a "measurement region".

(b) illustrates a case where a measurement region 62 is in unit of pixel. In this case, the data with the highest resolution can be obtained; however, since the distance data in unit of pixel is stored in the memory 52, the usage capacity of the memory 52 is increased.

(c) illustrates a case where a measurement region 63 is in unit of a plurality of pixels. In this example, the measurement region 63 is made up of 3×3 pixels. The distance variation measurement unit 51 obtains the average value of the distance data of the pixels in the measurement region 63 to store the average value in the memory 52. Accordingly, the usage capacity of the memory 52 that stores the distance data can be reduced.

(d) illustrates a case where all of the pixels of the image sensor 16 are collectively set as a measurement region 64. The distance variation measurement unit 51 obtains the average value of the distance data of all of 20×15 pixels to store the average value in the memory 52. In this case, the usage capacity of the memory 52 can be reduced most.

Subsequently, in the present embodiment, as illustrated in FIG. 4, the distance is repeatedly measured over a plurality of frames (n frames), and a temporal variation thereof is obtained. Therefore, n distance values are stored in the memory 52, and the distance variation measurement unit 51 reads the n distance values from the memory 52 to calculate a distance variation value in each of the measurement regions. The number of the distance variation values is 20×15=300 in the case illustrated in (b) (measurement region 62) of FIG. 6. In addition, the number of the distance variation values is 3×3=9 in the case illustrated in (c) (measurement region 63) of FIG. 6. The number of the distance variation values is 1 in the case illustrated in (d) (measurement region 64) of FIG. 6.

Figure 7:
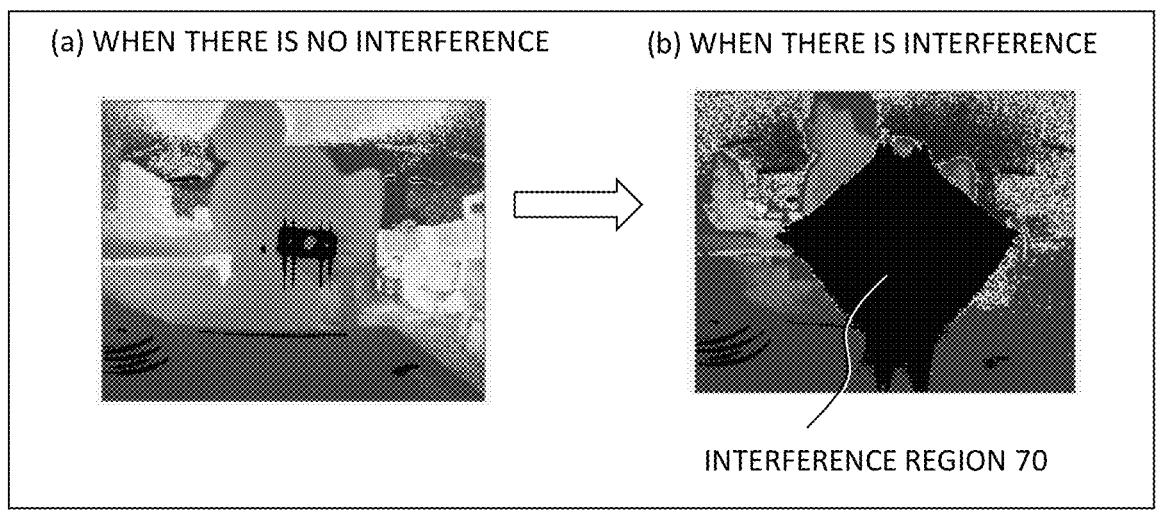
FIG. 7 shows pictures of an example of a distance image when interference occurs.

FIG. 7 shows pictures of an example of a distance image when interference occurs. In (a), a distance image when there is no interference is illustrated for comparison and in (b), a distance image when there is interference is illustrated in the entire region of the image sensor 16. In the normal distance image, the distances to the object are color-coded and illustrated (illustrated in gray in this picture). However, a region where there is interference has a large variation of distance values and is illustrated in, for example, black as illustrated by reference sign 70. It is rare for an interference region 70 to occur in the entire region of the image sensor 16, and in many cases, the interference region 70 appears in a part of the image sensor 16. Therefore, it is required to set the measurement regions 62 to 64 in FIG. 6 in consideration of the size of the interference region 70.

For example, when the measurement region is set to be large as the measurement region 64 in (d) of FIG. 6, the interference region 70 shown in FIG. 7 is seen as the average value of the entirety of the distance image, so that the distance variation, namely, interference is not noticeable, which is a problem. Therefore, in an actual distance measurement device, it is preferable that in consideration of the memory capacity or calculation ability, the measurement region is set to be as small as possible.

The distance variation measurement unit 51 uses the following well-known standard deviation equation (1) to calculate the distance variation. Here, $x_i$ is an $i^{th}$ measured distance value and x-bar is the average value of $x_i$. A standard deviation s for n measurements that are performed on each measurement region in the predetermined duration is calculated by the equation to be set as a variation of the distance values.

$$s = \sqrt{\frac{1}{n}\sum_{i=1}^{n}(x_i - \bar{x})^2}$$ [Equation 1]

The standard deviation s is calculated for each measurement region, and the maximum value thereof is obtained and used as a representative value. Namely, the spatial maximum value is obtained. For example, in the case illustrated in (b) (measurement region 62) of FIG. 6, 300 variation values are calculated and the maximum value thereof is used as a representative value. For example, in the case illustrated in (c) (measurement region 63) of FIG. 6, nine variation values are calculated and the maximum value thereof is used as a representative value. In the case illustrated in (d) (measurement region 64) of FIG. 6, one variation value is calculated and the variation value is used as a representative value as it is.

Thereafter, while causing the light emission and exposure period-setting unit 54 to shift the start timing of the light emission and exposure duration, similar to the above manner, the distance variation measurement unit 51 measures a variation of distance values in each measurement region in the predetermined duration (n measurements). Then, a representative value of the distance variations for each start timing is obtained, and when the representative value exceeds the past representative value (maximum value) obtained from the start of measurement, the value is stored in the memory 52 as a new maximum value. In such a manner, spatially and temporally maximum variation value is stored in the memory 52.

An operation of shifting the start timing of the light emission and exposure duration to measure the distance will be described. The light emission and exposure period-setting unit 54 resets the start timing of the light emission and exposure duration for the distance calculation unit 17 when a certain duration is shifted for the reference clock of the light emission and exposure period-setting unit 54. Accordingly, the start timing can be intentionally shifted by the time difference Tdif in FIG. 5 to change a state of interference. Since the start timing of the light emission and exposure duration is shifted, it is possible to measure the distance variation including a case where interference from other devices is small and a case where interference therefrom is large. In other words, a state where the light emission and exposure duration of the host device overlaps the light emission and exposure durations of the other devices that are interference sources, namely, a state where interference is maximum can be found by this method.

For example, when the light emission and exposure duration is 20 msec and the data output duration is 13 msec in FIG. 5, measurements that are performed while shifting the time difference Tdif 26 times at an interval of 0.5 msec can include a state where the light emission and exposure durations of two devices overlap each other. In such a manner, the time difference Tdif is shifted and measurements are performed m times.

As described above, the distance variation measurement unit 51 calculates a distance variation from the n measurements performed at a start timing, and performs measurements m times while shifting the start timing, to store the maximum value of m distance variation values in the memory 52. The maximum value of the distance variations stored in the memory 52 in such a manner correspond to a state where interference from other devices is maximum.

Next, the distance variation measurement unit 51 sets the light emission and exposure period of the host device to a different value to measure the distance variation. The values of the light emission and exposure periods that are settable for the host device are stored in the light emission and exposure period-setting unit 54, and are designated by number k of the light emission and exposure period list. For example, when 15 types of periods are settable, the period is changed in order of k=1 to 15 and the distance variation in each of the periods is measured. The distance variations that are measured while changing the light emission and exposure period are stored in the memory 52. When the periods of interference light from other devices are equal to the light emission and exposure period of the host device, the distance variation is increased, and thus the periods of the interference light of the other devices can be specified. Then, in order to avoid interference from the other devices, the light emission and exposure period of the host device may be set so that the specified period is avoided.

After a series of the measurements are completed, the distance variation measurement unit 51 reads the distance variation value (maximum value of the variations) stored in the memory 52 to send the distance variation value to the interference determination unit 53. The interference determination unit 53 sets a value, which is obtained by dividing the distance variation value by the maximum value of the measurement range of the distance measurement device, as an interference ratio (percentage) and compares the interference ratio to a threshold value which is determined in advance, to determine that interference occurs, when the interference ratio is larger than the threshold value.

Figure 8:
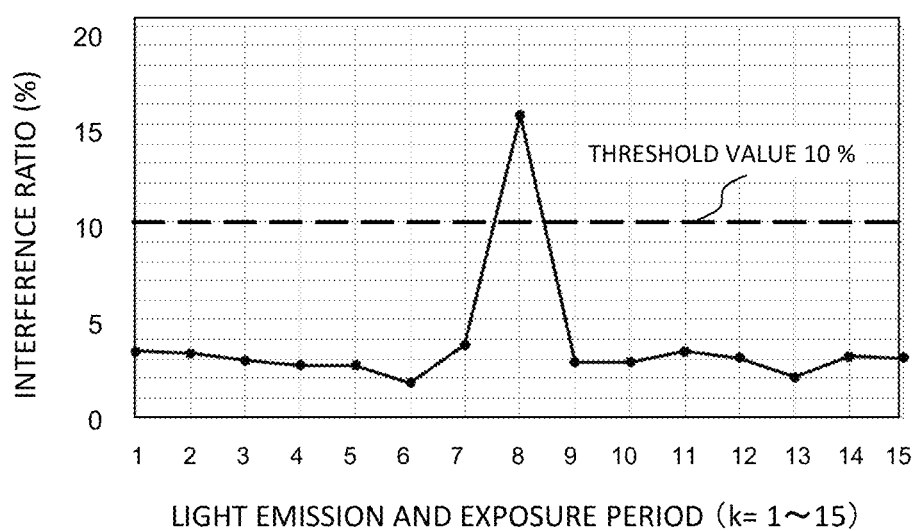
FIG. 8 is a graph showing an example of interference ratios that are measured while changing a light emission and exposure period.

FIG. 8 is a graph showing an example of interference ratios that are measured while changing the light emission and exposure period. The light emission and exposure period of the host device is changed to k=1 to 15 of the light emission and exposure period list and the interference ratio is measured. In this example, when the light emission and exposure period of the host device is set to k=8, the interference ratio is largest. In addition, the threshold value for determining whether or not there is interference is set to, for example, 10% and a light emission and exposure period where there is interference can be distinguished from a light emission and exposure period where there is no interference. The threshold value is determined in consideration of the performance or specifications of the distance measurement device. From this result, it can be specified that the light emission and exposure period used in another device is k=8 and interference occurs in the period.

Figure 9:
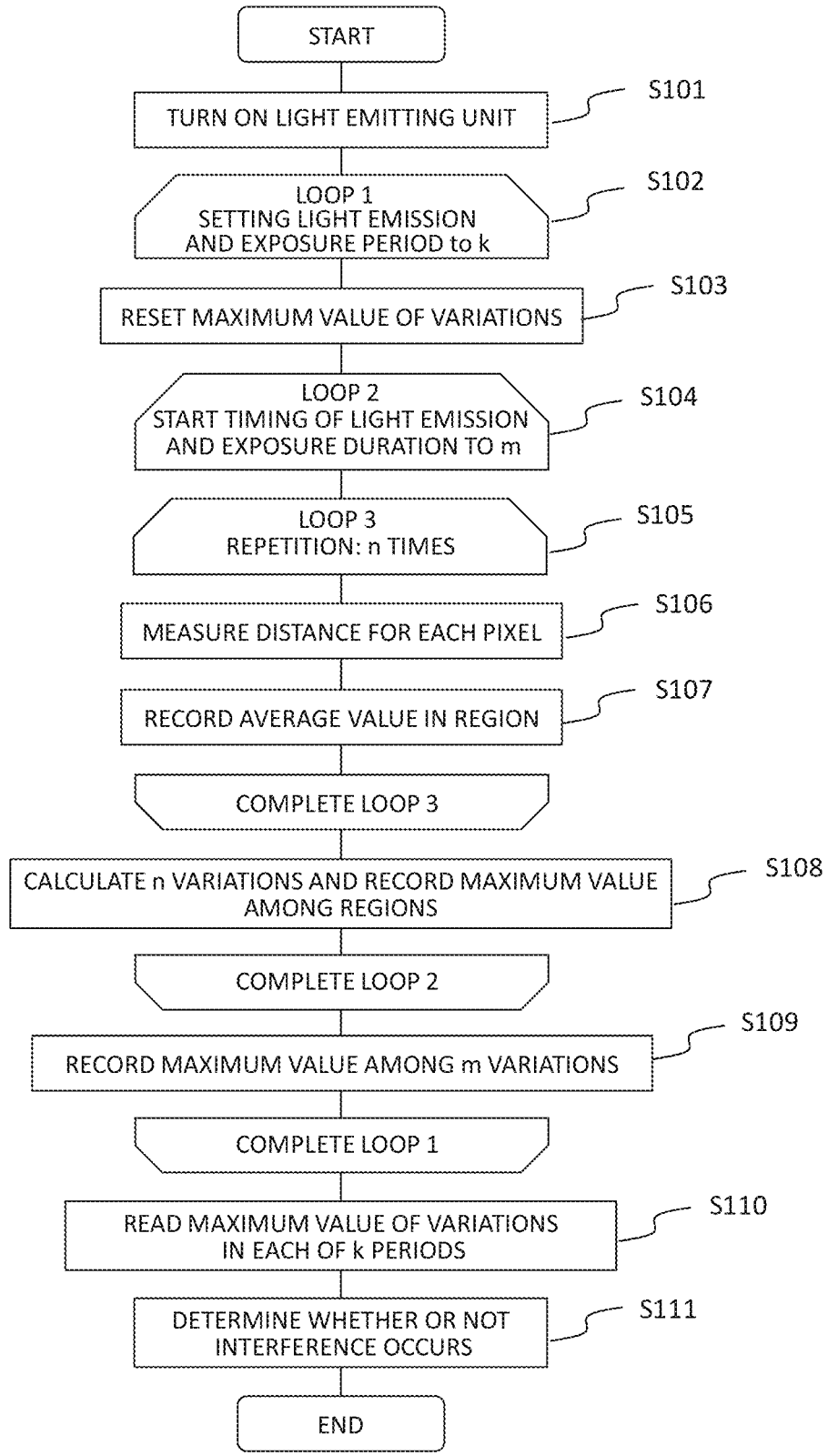
FIG. 9 is a flowchart of an interference detection process.

FIG. 9 is a flowchart of an interference detection process. The following process is executed mainly by the distance variation measurement unit 51 in the controller 18.

S101: The light emitting unit 11 is turned on.

S102 (loop 1): The light emission and exposure period is changed to k and steps from S103 to S109 are repeated. For example, as shown in FIG. 8, the light emission and exposure period is changed to k=1 to 15 and measurements are performed. In loop 1, the maximum value of distance variations in each light emission and exposure period is obtained.

S103: The maximum value of the variations in the memory 52 is reset.

S104: (loop 2): The start timing of the light emission and exposure duration is shifted m times and steps from S105 to S108 are repeated. For example, in the case of FIG. 5, m is 26. In loop 2, a change in distance variations at the start timings is obtained.

S105 (loop 3): The distance measurement from S106 to S107 is repeatedly performed n times. For example, when the distances are acquired at 30 frames/sec, measurements can be repeatedly performed 30 times for 1 sec.

S106: The light emission and exposure is performed in the manner illustrated in FIG. 2 and the distance calculation unit 17 calculates the distance D for each pixel of the image sensor 16.

S107: The average value of the distance values in the measurement region is obtained in unit of the measurement region set in FIG. 6 and is recorded in the memory 52.

S108: When the n measurements in loop 3 are completed, the distance variations are calculated by the standard deviation equation. The distance variation values of which the number corresponds to the number of the measurement regions are obtained and the maximum value thereof is recorded in the memory 52.

S109: When the measurements at m start timings in loop 2 are completed, the maximum value of the variations is obtained from m distance variations and is recorded in the memory 52.

S110: When the measurements in k periods in loop 1 are completed, the maximum value of the variations (distance variation value) in each of the k periods is read from the memory 52.

S111: The interference determination unit 53 calculates an interference ratio from the distance variation value and compares the interference ratio to the threshold value to determine whether or not interference occurs. As a result of determination, for example, as shown in FIG. 8, the value of the interference ratio is output, or whether or not there is interference in each light emission and exposure period is output (displayed).

According to the first embodiment, before the distance measurement device starts a distance measurement operation, a light emission and exposure period where interference is received can be determined in advance, and a light emission and exposure period is settable so as to avoid the light emission and exposure period. Therefore, unlike the related art where interference detection is performed and interference measures are taken during distance measurement operation and thus the measurement result includes a distance error or the measurement rate is reduced, such an event does not occur.

Second Embodiment

A second embodiment relates to the assignment of a light emission and exposure period to each device in a distance measurement system in which a plurality of the distance measurement devices are installed.

Figure 10A:
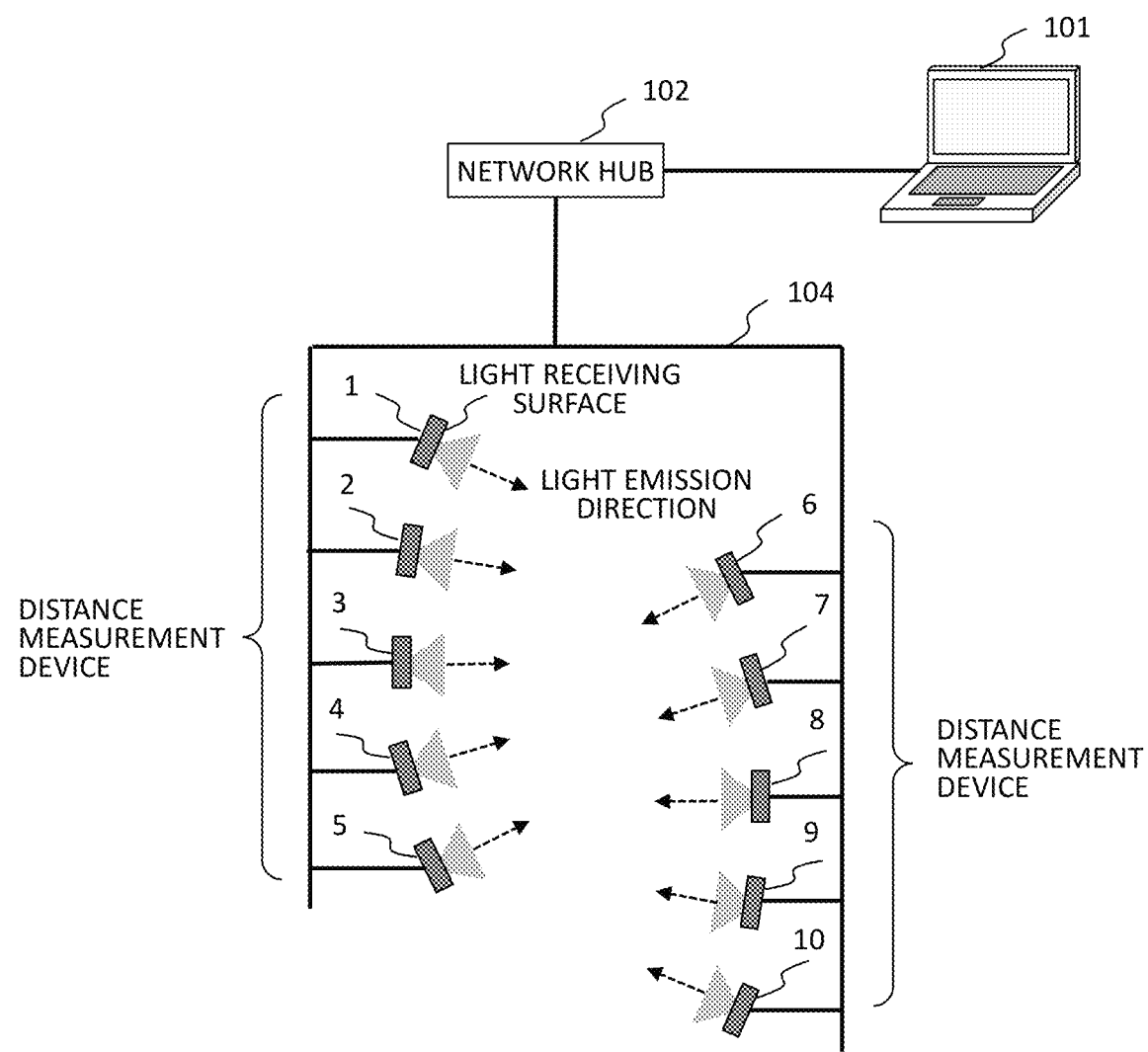
FIG. 10A is a configuration diagram illustrating a distance measurement system according to a second embodiment.

FIG. 10A is a configuration diagram illustrating the distance measurement system according to the second embodiment. In the distance measurement system, the plurality of devices (in this example, distance measurement devices 1 to 10) are connected to a PC 101, which is a management device, via a network cable 104 and a network hub 102. Light emission directions and the directions of light receiving surfaces differ from each other depending on the installation states of the devices.

The management device (PC) 101 executes an automatic period assignment application to assign a proper light emission and exposure period for avoiding interference to each device. For this reason, a distance measurement device is selected and instructed to detect interference between the devices, and the selected device performs the interference detection operation described in the first embodiment. Whether or not interference occurs is determined by a positional relationship between the devices, namely, the light emission directions and the directions of the light receiving surfaces, and each device determines whether or not there is interference to transmit the result of determination to the PC 101. The PC 101 assigns a proper light emission and exposure period for avoiding interference to each device, based on the result of interference of each device.

FIG. 10B is a block diagram illustrating a functional configuration of the management device (PC) 101. A distance measurement device-selecting unit 111 selects a device that performs interference detection and a device that emits light which is interference light, from the devices. A light emission and exposure period-selecting unit 112 designates light emission and exposure periods to the selected devices. An interference result recording unit 113 receives an interference detection result from each device to record the interference detection result in the memory 116. A light emission and exposure period-assigning unit 115 reads the interference detection result from the memory 116 to assign a proper light emission and exposure period to each device. A communication unit 114 communicates with the distance measurement devices 1 to 10 via the network hub 102 and the network cable 104.

Hereinafter, an operation of the distance measurement system in the present embodiment will be described.

The distance measurement device-selecting unit 111 of the PC 101 selects a device that performs interference detection (interference detection device) and a device that emits light which is interference light (interference light generation device), via the communication unit 114 and the network hub 102 (network cable 104). The light emission and exposure period-selecting unit 112 sets the same light emission and exposure period (for example, period number k=1) for the selected devices. Incidentally, since the following interference detection operation is performed in a state where the light emission and exposure period is fixed to one value, initially, the same light emission and exposure period may be set for all of the distance measurement devices 1 to 10.

For example, the distance measurement device-selecting unit 111 designates the device 1 as the interference detection device and the device 2 as the interference light generation device. The device 1 performs an interference detection operation according to the manner of the first embodiment. However, in the second embodiment, since devices between which interference occur may be checked, the light emission and exposure period (number k) is set to be common between the devices, and a process of changing the period is not required. When the interference detection is completed, the device 1 transmits a detection result to the PC 101 via the network hub 102 (network cable 104), and the interference result recording unit 113 records the result in the memory 116.

Next, the distance measurement device-selecting unit 111 causes the device 2 to stop emitting light, and designates the device 3 as the interference light generation device. Then, the distance measurement device-selecting unit 111 instructs the device 1 to perform interference detection again and receives a detection result from the device 1, and the interference result recording unit 113 stores the result in the memory 116. Thereafter, the interference detection is executed while changing a combination of the devices.

FIG. 11 is a table showing a combination of distance measurement devices that perform interference detection. Two devices are selected from the plurality of devices to perform interference detection and generate interference light. Incidentally, the order of executing interference detection is indicated by numbers (italics). In this example, since ten distance measurement devices are used, interference detection may be executed for 45 ($=_{10}C_2$) combinations. The reason is that a result as to whether or not there is interference is the same even if the interference detection device and the interference light generation device are switched. As a result of the interference detection, a mating distance measurement device (interference source) that causes interference is identified in the distance measurement devices.

FIG. 12 is a table showing a configuration example of the memory 116. When interference detection is started, regions that store interference detection results are dynamically secured according to the number of the distance measurement devices and the number of combinations. In addresses 1 to 90, combinations of the interference detection devices and the interference light generation devices of FIG. 11 are arranged in order. As an interference detection result, "00" is recorded when there is no interference and "01" is recorded when there is interference.

When interference detection for all of the combinations is completed, the light emission and exposure period-assigning unit 115 reads interference detection results in the memory 116 to assign a proper light emission and exposure period to each of the distance measurement devices. However, when the number of the light emission and exposure periods that are settable for the devices is limited, the number of the light emission and exposure periods that are settable may be smaller than the number of the devices, and the same light emission and exposure periods have to overlap between a part of the devices and other devices. Therefore, in order to avoid interference in the entirety of the system, the assignment of a light emission and exposure period is performed according to the following rules.

(1) The numbers of the light emission and exposure periods are assigned to the distance measurement devices in order of having a larger interference with other distance measurement devices. Accordingly, non-duplicate light emission and exposure periods can be preferentially assigned to the distance measurement devices that cause interference with a large number of other devices.

(2) The light emission and exposure periods that are already assigned to the other devices are allowed to be duplicately assigned to the distance measurement devices having a small interference with the other distance measurement devices. However, since the mating devices that cause interference are already known, light emission and exposure periods that are not used by the mating devices are assigned.

(3) The distance measurement devices may be divided into a distance measurement device group that causes interference and a distance measurement device group which has no interference with the group, depending on the arrangement of the distance measurement devices. In that case, the light emission and exposure periods may be assigned only between the devices in one group.

Accordingly, even if the number of the light emission and exposure periods that are settable is smaller than the number of the distance measurement devices, the distance measurement system that can avoid interference between all of the devices can be established.

FIG. 13 shows an example of interference detection results and the assignment of the light emission and exposure periods according to the above rules in this example. As the interference detection results, combinations of the devices where interference occurs are indicated by an x mark, and the number of the devices that are interference sources is indicated for each of the distance measurement devices. As a result, the amount of interference with other devices is large in order of the distance measurement devices 7, 4, 8, 2, 3, 5, 6, 9, 1, and 10. Here, it is assumed that the number of the light emission and exposure periods that are settable is 8 (number k=1 to 8) and is smaller than the number (10) of the distance measurement devices.

The periods are assigned to the devices in order of having a larger number of interference sources according to the above rule (1), and the periods k=1, 2, 3, . . . are assigned to the distance measurement devices 7, 4, 8, . . . in order. In such a manner, the light emission and exposure periods k=1 to 8 can be assigned up to the distance measurement device 9 without duplication.

The duplicate light emission and exposure periods are assigned to the remaining distance measurement devices 1 and 10 according to the above rule (2). The interference sources of the distance measurement device 1 are the devices 2, 6, and 7, and the periods k=4, 7, and 1 are already assigned to the devices. Therefore, for example, k=2 is assigned as other period. Similarly, the interference sources of the distance measurement device 10 are the devices 5 and 9, and the periods k=6 and 8 are already assigned to the devices. Therefore, for example, k=1 is assigned as other period.

Figure 14:
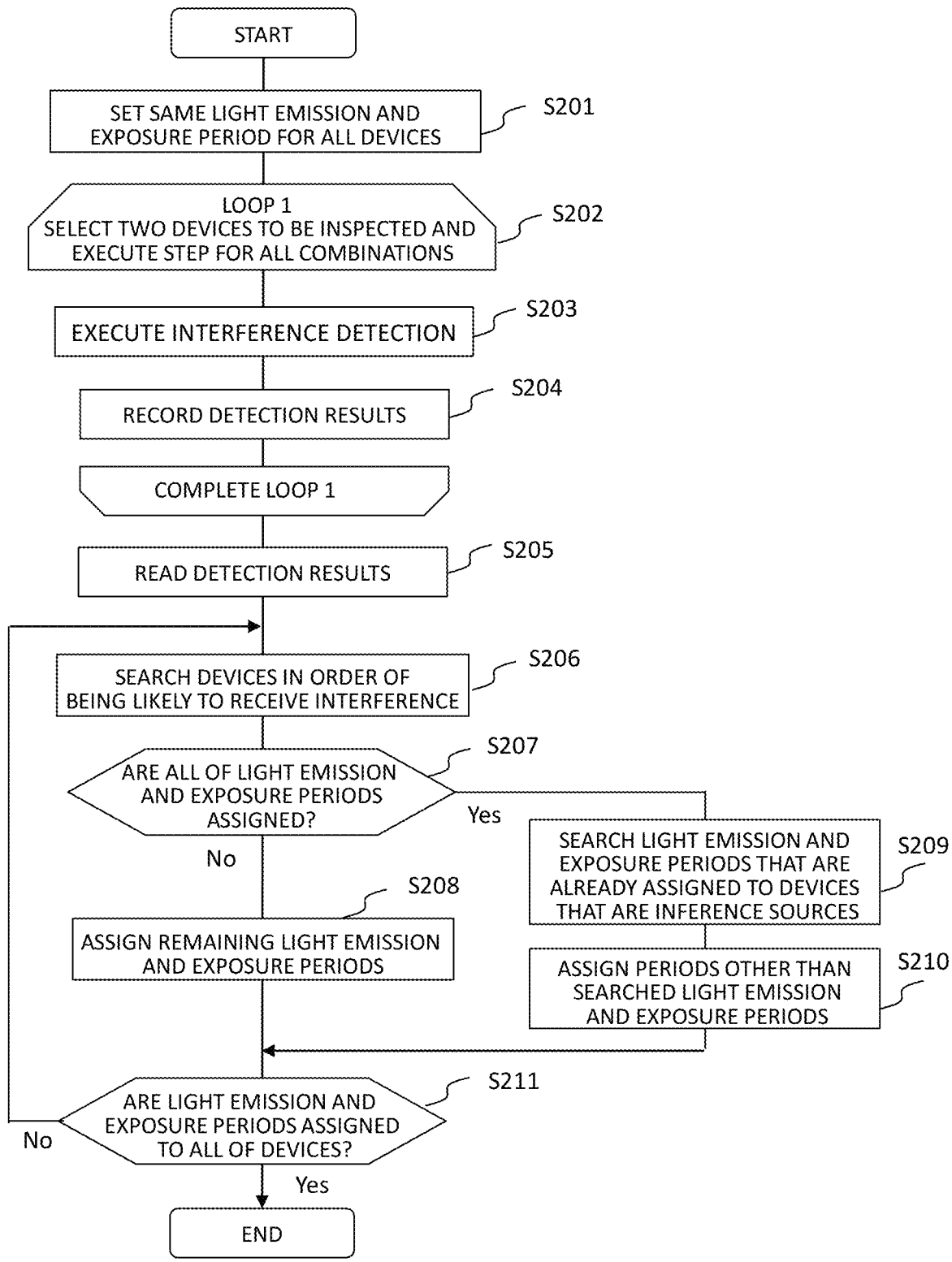
FIG. 14 is a flowchart illustrating assigning a period to each of the distance measurement devices.

FIG. 14 is a flowchart illustrating assigning a period to each of the distance measurement devices. The following process is executed mainly by the PC 101 that is a management device.

S201: The light emission and exposure period-selecting unit 112 of the PC 101 sets the same light emission and exposure period (for example, period number k=1) for all of the distance measurement devices 1 to 10 via the network hub 102 and the network cable 104.

S202 (loop 1): The distance measurement device-selecting unit 111 sets two devices that are to be inspected, and executes steps from S203 to S204. As shown in FIG. 11, the steps are performed for all the combinations of the devices.

S203: A first device (interference detection device) that is selected performs interference detection in the set light emission and exposure period, and a second device (interference light generation device) generates interference light in the selected light emission and exposure period. Incidentally, the first device (interference detection device) may stop emitting light and perform only an exposure operation. The interference detection is performed in the same manner as the flowchart of FIG. 9 in the first embodiment; however, the setting of the light emission and exposure period (loop 1 of S102) only to 1 set in S201 is performed.

S204: When the interference detection is completed, the first device transmits an interference detection result to the PC 101, and the interference result recording unit 113 records the result in the memory 116.

When the inspection for all of the combinations of the devices in loop 1 is completed, as shown in FIG. 12, interference detection results are recorded in the memory 116.

S205: The light emission and exposure period-assigning unit 115 reads the interference detection results from the memory 116 to assign the light emission and exposure periods.

S206: With reference to the interference detection results, the devices (hereinafter, referred to as the concerned devices) are searched from the inspected distance measurement devices, in order of having a larger number of the devices that are interference sources, namely, in order of being likely to receive interference.

S207: It is determined whether or not all of the light emission and exposure periods that are settable are assigned. When all of the light emission and exposure periods are not assigned (No), the process proceeds to S208, and when all of the light emission and exposure periods are assigned (Yes), the process proceeds to S209.

S208: The remaining light emission and exposure periods that are not yet assigned are assigned to the concerned devices searched in S206. Thereafter, the process proceeds to S211.

S209: The devices that are interference sources to the concerned devices are searched, and the light emission and exposure periods that are already assigned to the devices that are interference sources are searched.

S210: The light emission and exposure periods other than the searched light emission and exposure periods are assigned to the concerned devices.

S211: It is determined whether or not the light emission and exposure periods are assigned to all of the devices. When the light emission and exposure periods are not assigned to all of the devices, the process returns to S206 to search the next device. When the light emission and exposure periods are assigned to all of the devices, the process ends.

According to the second embodiment, in the distance measurement system in which a large number of the distance measurement devices are used, before a distance measurement operation is started, a light emission and exposure period for avoiding interference can be properly assigned to each device. Namely, even if the number of the light emission and exposure periods that are settable is smaller than the number of the distance measurement devices, it is possible to avoid a situation where the assignment of the periods does not converge.

What is claimed is:

1. A distance measurement device that measures a distance to an object by a time of flight of light, the device comprising: a light emitting unit that irradiates the object with pulsed light emitted from a light source; a light receiving unit that exposes the pulsed light, which is reflected by the object, to an image sensor to convert the pulsed light into an electric signal; a memory storing a plurality of distance values repeatedly obtained by a predetermined light emission and exposure duration of the light emitting unit and the light receiving unit respectively indicating a distance to the object from an output signal of the light receiving unit; and a controller coupled to the memory that controls the light emitting unit and the light receiving unit to determine whether or not there is interference from another distance measurement device, wherein the controller is configured to: for each of a plurality of light emission and exposure periods of the light emitting unit and the light receiving unit, obtain a maximum distance variation value by: obtaining an average value of the distance values in each measurement region of a plurality of measurement regions of the image sensor, calculate distance variations by a standard deviation equation for each measurement region and obtain a maximum distance variation value, and compare each maximum distance variation value for each light emission and exposure period to a predetermined threshold value to determine whether there is interference.

2. The distance measurement device according to claim 1, wherein the controller is configured to: change the light emission and exposure period of the light emitting unit and the light receiving unit according to the plurality of light emission and exposure periods, and determine a light emission and exposure period, among the plurality of light emission and exposure periods, when interference is received.

3. The distance measurement device according to claim 1, wherein the controller is configured to: while shifting a start timing of the light emission and exposure duration of the light emitting unit and the light receiving unit, measure the distance variations to obtain the maximum distance variation value among the distance variations at the start timings.

4. The distance measurement device according to claim 1, wherein the light receiving unit is formed of the image sensor in which a plurality of pixels are arranged, and wherein the controller is configured to measure the distance variation in each measurement region of which a measurement region includes one pixel or the plurality of pixels, to obtain the maximum distance variation value among the distance variations in the measurement regions.

5. A distance measurement system in which when a plurality of distance measurement devices are installed to measure a distance, each of the distance measurement devices is connected to a management device and which assigns a light emission and exposure period to each of the distance measurement devices, wherein the management device includes a computer programmed to: sequentially select a distance measurement device that performs interference detection and a distance measurement device that emits light which is interference light, from the distance measurement devices, to perform an interference detection operation, the interference detection operation including selecting two distance measurement devices from the plurality of distance measurement devices at a time to perform interference detection and generate interference light to determine a plurality of combinations of mating distance measurement device interference sources and interference detection distance measurement devices and store in a memory the plurality of combinations, set a same light emission and exposure period for the selected distance measurement devices so as to detect interference, receive interference detection results from the selected distance measurement devices to record the interference detection results in the memory, and read the interference detection results from the memory and a light emission and exposure period for avoiding interference to each of the distance measurement devices, and assign the light emission and exposure periods, which are not assigned to distance measurement devices that are interference sources, to distance measurement devices in order of having a larger interference with other distance measurement devices.

6. The distance measurement system according to claim 5, wherein when the number of the light emission and exposure periods that are settable for the distance measurement devices is smaller than the number of the distance measurement devices, the management device assigns the same light emission and exposure period to distance measurement devices between which there is no interference.

7. The distance measurement system according to claim 5, wherein before the distance is measured by the plurality of distance measurement devices, the management device assigns a light emission and exposure period to each of the distance measurement devices.

\* \* \* \* \*